(12) United States Patent
Lee

(10) Patent No.: US 11,007,582 B2
(45) Date of Patent: May 18, 2021

(54) DEPTH ADJUSTMENT STOPPER FOR DRILL BIT

(71) Applicant: Jae Yeol Lee, Seoul (KR)

(72) Inventor: Jae Yeol Lee, Seoul (KR)

( * ) Notice: Subject to any disclaimer, the term of this patent is extended or adjusted under 35 U.S.C. 154(b) by 0 days.

(21) Appl. No.: 16/089,683

(22) PCT Filed: Feb. 2, 2018

(86) PCT No.: PCT/KR2018/001417
§ 371 (c)(1),
(2) Date: Sep. 28, 2018

(87) PCT Pub. No.: WO2018/169205
PCT Pub. Date: Sep. 20, 2018

(65) Prior Publication Data
US 2020/0306839 A1    Oct. 1, 2020

(30) Foreign Application Priority Data
Mar. 15, 2017    (KR) .................. 10-2017-0032758

(51) Int. Cl.
*B23B 49/00* (2006.01)

(52) U.S. Cl.
CPC ........ *B23B 49/003* (2013.01); *B23B 2215/68* (2013.01); *B23B 2260/0482* (2013.01); *B23B 2260/136* (2013.01)

(58) Field of Classification Search
CPC ... B23B 49/003; B23B 49/005; B23B 51/104; B23B 2260/0482; B23B 2260/138
See application file for complete search history.

(56) References Cited

U.S. PATENT DOCUMENTS

| | | | |
|---|---|---|---|
| 4,039,266 A | 8/1977 | John et al. | |
| 4,138,200 A | * 2/1979 | Nazarenus | ............ B23B 49/005 |
| | | | 408/112 |
| 6,739,872 B1 | * 5/2004 | Turri | ...................... A61B 17/16 |
| | | | 433/75 |

FOREIGN PATENT DOCUMENTS

| | | |
|---|---|---|
| CH | 209896 A | 5/1940 |
| CN | 203390257 U | 1/2014 |
| CN | 104227087 A | 12/2014 |
| CN | 104551118 A | 4/2015 |
| CN | 104972163 A | 10/2015 |
| CN | 205386646 U | 7/2016 |
| DE | 807154 C1 * | 6/1951 ........... B23B 49/003 |
| JP | U11977062579 | 5/1977 |
| JP | U11977072182 | 5/1977 |
| JP | U11979045488 | 3/1979 |

(Continued)

OTHER PUBLICATIONS

English translation of DE 807154. (Year: 1951).*

(Continued)

*Primary Examiner* — Alan Snyder
(74) *Attorney, Agent, or Firm* — Antonio Ha & U.S. Patent, LLC

(57) ABSTRACT

The present invention relates to a depth adjustment stopper for a drill bit. The present invention enables easy workability during forming of a drilled groove having a fixed depth into a material by means of a drill bit. The depth adjustment stopper coupled to the drill bit is supported by means of the tension of a spring. Therefore, the depth adjustment stopper is prevented from shaking or being pushed.

3 Claims, 5 Drawing Sheets

(56) References Cited

FOREIGN PATENT DOCUMENTS

| | | |
|---|---|---|
| JP | S58812 U | 1/1983 |
| JP | 06-039313 | 5/1994 |
| JP | H0639313 U | 5/1994 |
| JP | H06262432 A | 9/1994 |
| JP | 3096116 U | 9/2003 |
| JP | 2005-169591 | 6/2005 |
| KR | 10-2016-0002084 | 1/2016 |
| KR | 10-2017-0017277 | 2/2017 |

OTHER PUBLICATIONS

English Abstract of 06-039313.
English Specification of 10-2016-0002084.
English Specification of 10-2017-0017277.
English Abstract of 2005-169591.
English Specification of CN104227087A.
English Specification of CH209896A.
English Specification of JPU11977062579.
English Specification of JPH06262432A.
English Specification of JPU11979045488.
English Specification of JP3096116U.
English Specification of JPU11977072182.
English Specification of CN104551118A.
English Specification of CN104972163A.
English Specification of CN205386646U.
English Specification of CN203390257U.
English Specification of JPH0639313U.
English Specification of JPS58812U.
English Specification of 10-2016-0002084A.
Metal-Cutting Machine Tool edited by Zhu et al, published by Southeast University Press, 2nd edition in February.

* cited by examiner

DEPTH ADJUSTMENT STOPPER FOR DRILL BIT

CROSS-REFERENCE TO RELATED APPLICATIONS

This patent application is a national-stage application of International Patent Application No. PCT/KR2018/001417, filed on Feb. 2, 2018, which claims priority under 35 U.S.C. § 119 to Korean Patent Application No. 10-2017-0032758, filed on Mar. 15, 2017, in the Korean Intellectual Property Office, the disclosure of which is incorporated by reference herein in its entirety.

TECHNICAL FIELD

The present invention relates to a depth-adjustable stopper for drill bits, and more specifically, to a depth-adjustable stopper for a drill bit, which is installed to be moved in the axial direction of the drill bit along a male thread portion formed on the outer circumferential surface of the drill bit and is supported by a spring to be prevented from being shaken or pushed back.

DISCUSSION OF RELATED ART

Generally, drills are used to easily make through holes in materials.

A drill includes a casing with a switch-equipped handle, a converter in the casing to convert electrical energy into mechanical rotational energy, and a spindle provided at the output side of the converter and rotating with an increased torque by a separate decelerator to rotate a drill bit fitted into a drill chuck at the end of the spindle to thereby form a through hole.

The drill bit fitted into the drill chuck has a cylindrical body elliptically threaded along the outer circumferential surface thereof, and has a bite part at its end of body which is cut inclinedly at both sides. The bite part is placed on the material and in this position is rotated at low or high speed thereby drilling the material while flying material chips. The material chips are discharged out through a through hole formed in the drill bit body.

Drilling proceeds as follows. The worker holds the handle of the drill and puts the drill bit on a face of a material, and then presses the switch to rotate the drill bit while pressurizing the drill. If the worker desires to form a hole to a predetermined depth rather than penetrating, he is prone to make a mistake to form a hole to a larger depth or a through hole in the material.

An approach to address the issue is as follows. A gradation support with gradations is coupled with the casing by a support fastener, and in this position, the screw in the support fastener is released to let the gradation support come in or out to thereby be fastened in any position, thereby setting up a travel distance of the drill bit, i.e., the depth of a hole.

However, the use of the gradation support requires a coupling and releasing of the support fastener to/from the casing, thus causing the work to be bothersome.

Further, the casing needs a space to save the gradation support separated therefrom, but securing a space is not easy.

When carelessly stored, it may be lost.

Further, such way keeps it away form the drill bit by a predetermined distance, likely causing an error in the depth of the hole.

There is a conventional product that may be combined with a drill bit. This uses a headless bolt for depth adjustment which is fastened or released by use of a wrench. This is annoying. Further, this adopts the way of using a headless bolt for fastening, suffering from an increased thickness due to the headless bolt.

In other words, such conventional product is inconvenient in use in light of using a wrench for fastening and releasing.

SUMMARY

The present invention has been conceived to address the problems with the conventional art and aims to provide a depth-adjustable stopper coupled to a drill bit, which may allow for easier drilling using the drill bit and may be supported by the tension of a spring, thereby prevented from being shaken or pushed back.

To achieve the above objects, according to the present invention, a depth-adjustable stopper for a drill bit, which is provided to be moved in an axial direction of the drill bit along a male thread portion formed on an outer circumferential surface of the drill bit to be able to adjust a depth of a hole drilled, preferably comprises a spring configured to prevent the depth-adjustable stopper from being shake or pushed back due to a gap of the male thread portion and a fastener body fastened to the drill bit while spaced apart from the depth-adjustable stopper to support a tension of the spring.

The depth-adjustable stopper preferably comprises a rotational structure body including a female thread portion formed on an inner circumstance surface thereof to be engaged with the male thread portion of the drill bit and moving in the axial direction along the male thread portion of the drill bit, an adjusting structure body including a through hole to allow the rotational structure body to fit thereinto and configured to freely rotate from the rotational structure body to face a material to be processed, and a bearing provided between the adjusting structure body and the rotational structure body, wherein when the rotational structure body rotates along with the drill bit, the adjusting structure body supports the material without receiving any influence from the rotation by the bearing.

Spring fixing grooves are preferably formed in respective opposite surfaces of the rotational structure body and the fastener body to support both ends of the spring.

An anti-slip knurling portion is preferably formed on an outer surface of the rotational structure body.

The fastener body preferably includes a female thread portion on an inner circumferential surface to be engaged with the male thread portion of the drill bit to be fastened, and wherein the female thread portion is formed in a portion of an end of the fastener body where the inner surface is formed.

According to the present invention, a depth-adjustable stopper for a drill bit which is installed to be moved in the axial direction of the drill bit along a male thread portion formed on the outer circumferential surface of the drill bit and is supported by a spring to be prevented from being shaken or pushed back, thereby enabling easier drilling to a predetermined depth in a material.

Further, after drilling, the depth-adjustable stopper, together with the drill bit, may be stored, eliminating the need for a separate space for storage and preventing loss.

The depth-adjustable stopper may directly be coupled with the drill bit, preventing an error from occurring in the depth of a hole drilled.

DETAILED DESCRIPTION OF EXEMPLARY EMBODIMENTS

Figure 1:
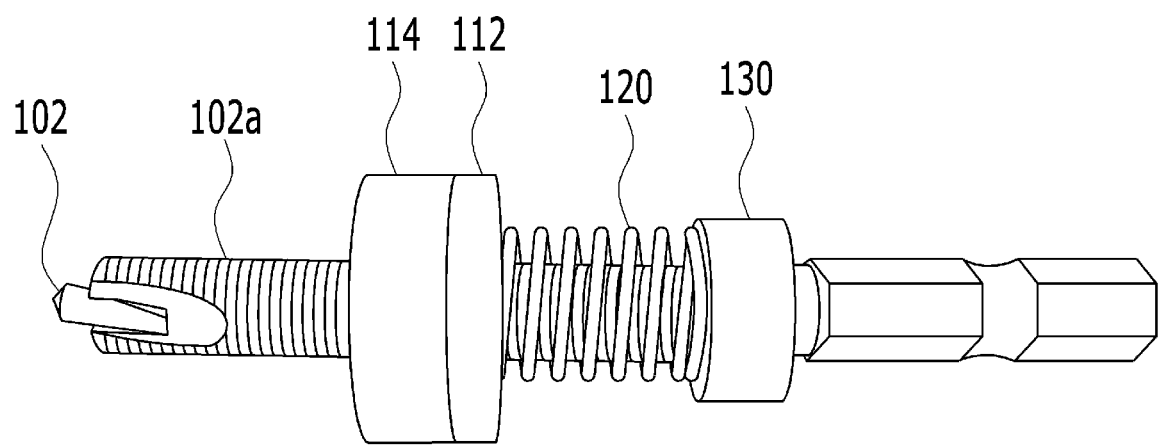
FIG. 1 is a photo of a product with a depth-adjustable stopper for a drill bit according to the present invention.

According to the present invention, there is provided a depth-adjustable stopper for a drill bit, which is provided to be moved in an axial direction of the drill bit along a male thread portion formed on an outer circumferential surface of the drill bit to be able to adjust a depth of a hole drilled, the depth-adjustable stopper comprising a spring configured to prevent the depth-adjustable stopper from being shake or pushed back due to a gap of the male thread portion and a fastener body fastened to the drill bit while spaced apart from the depth-adjustable stopper to support a tension of the spring.

Hereinafter, preferred embodiments of the present invention are described in detail with reference to the accompanying drawings.

Particular features or functional descriptions set forth below are provided merely as examples for the purpose of describing embodiments of the inventive concept, and the embodiments of the inventive concept may be practiced in various manners, and the present invention should not be interpreted as limited to the embodiments set forth herein.

Further, various changes may be made in form to the embodiments of the present invention. Particular embodiments are shown in the drawings as examples and are described herein in detail. However, the embodiments of the inventive concept are not intended as limited to those disclosed herein but should rather be appreciated as encompassing all changes, replacements, or equivalents thereof without departing from the scope and technical spirit of the present invention.

Figure 2:
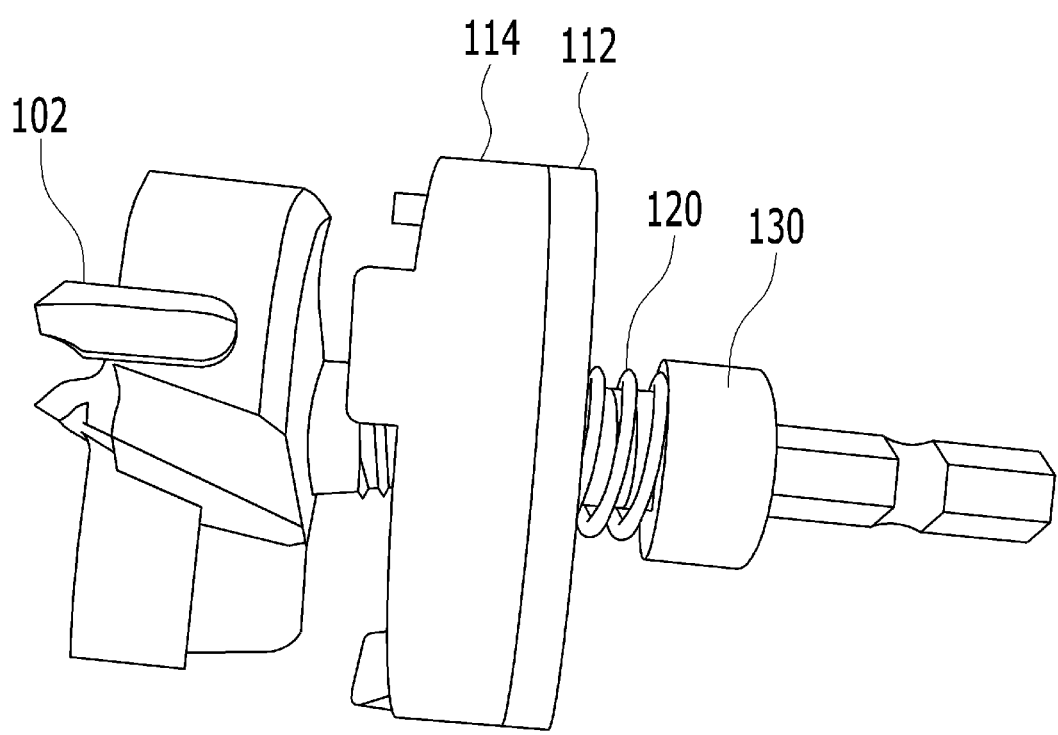
FIG. 2 is another photo of a product with a depth-adjustable stopper for a drill bit according to the present invention.
Figure 3:
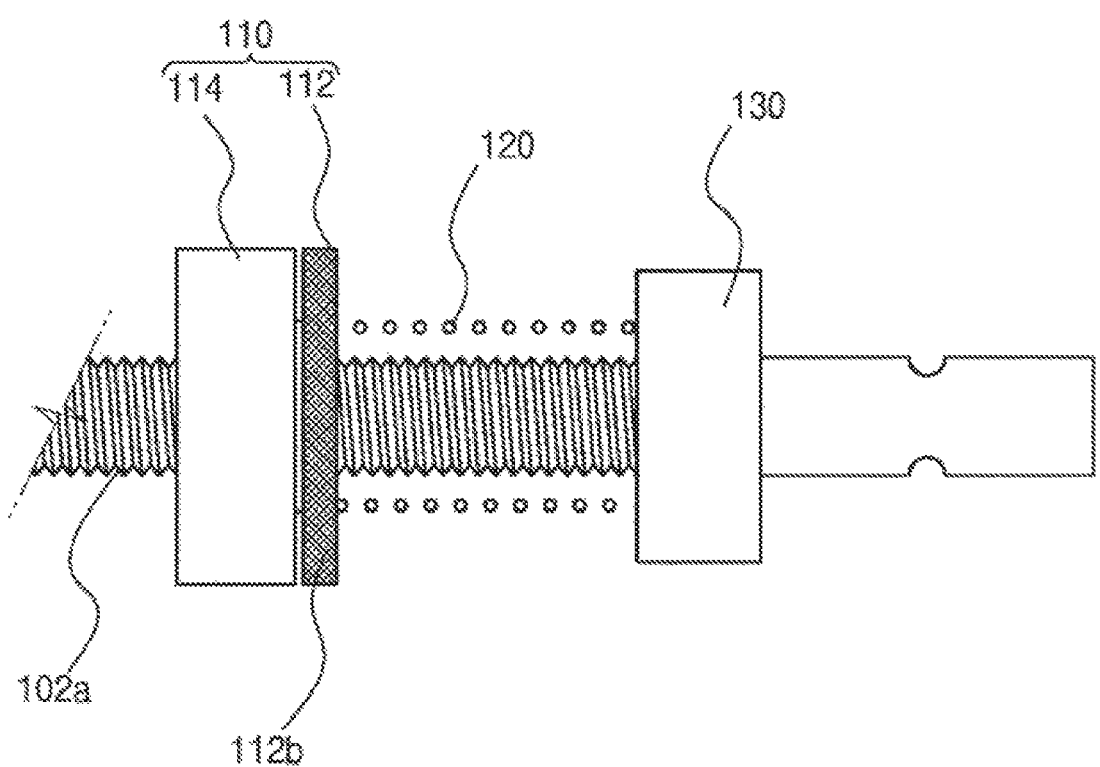
FIG. 3 is a front view of a product with a depth-adjustable stopper for a drill bit according to the present invention.
Figure 4:
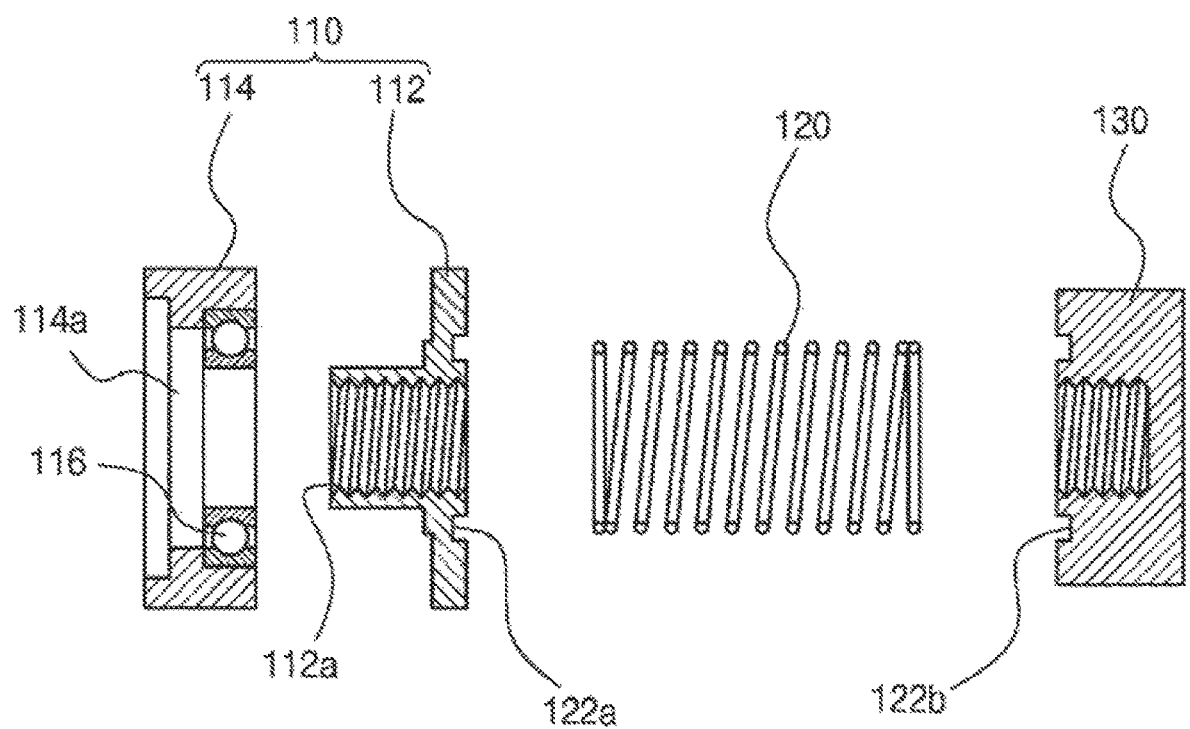
FIG. 4 is an exploded view of a configuration of a depth-adjustable stopper for a drill bit according to the present invention.
Figure 5:
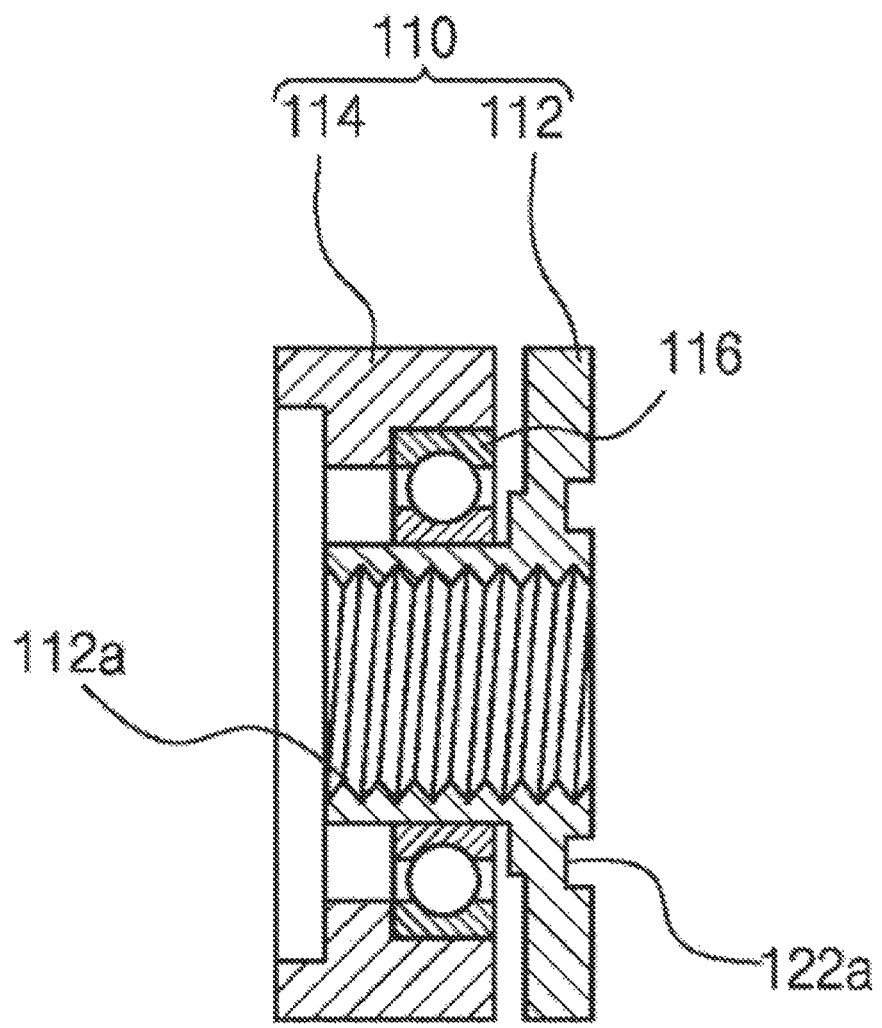
FIG. 5 is a cross-sectional view illustrating a depth-adjustable stopper for a drill bit according to the present invention.

FIG. 1 is a photo of a product with a depth-adjustable stopper for a drill bit according to the present invention. FIG. 2 is another photo of a product with a depth-adjustable stopper for a drill bit according to the present invention. FIG. 3 is a front view of a product with a depth-adjustable stopper for a drill bit according to the present invention. FIG. 4 is an exploded view of a configuration of a depth-adjustable stopper for a drill bit according to the present invention. FIG. 5 is a cross-sectional view illustrating a depth-adjustable stopper for a drill bit according to the present invention.

As shown in the figures, the present invention regards a depth-adjustable stopper for a drill bit, which is installed to be movable along the axial direction of a drill bit 102 to adjust the depth of the hole, and the present invention preferably includes a depth-adjustable stopper 110, a spring 120, and a fastener body 130.

The depth-adjustable stopper 110 is installed to move in an axial direction along a male thread portion 102a, which is formed on the outer surface of the drill bit 102, to be able to adjust the depth of a hole drilled.

The depth-adjustable stopper 110 preferably includes a rotational structure body 112, a rotational structure body 114, and a bearing 116.

At this time, the rotational structure body 112 has a female thread portion 112a on the inner circumferential surface thereof, which is engaged with the male thread portion 102a to be moved in the axial direction along the male thread portion 102a of the drill bit 102.

A knurling portion 112b is preferably formed on the outer circumferential surface of the rotational structure body 112 for an anti-slip purpose.

The rotational structure body 114 has a through hole 114a to allow the rotational structure body 112 to fit thereinto and to allow the rotational structure body 114 to freely rotate from the rotational structure body 112.

The rotational structure body 114 is installed to face a material to be processed.

Meanwhile, the bearing 116 is provided between the rotational structure body 114 and the rotational structure body 112 and allows the rotational structure body 114 to freely rotate regardless of the rotation of the rotational structure body 112.

The rotational structure body 112 of the depth-adjustable stopper 110 is coupled to be fitted into the inner diameter of the bearing 116 to allow the rotational structure body 114 to remain stationary without rotation upon drilling while only allowing the rotational structure body 112 and the drill bit 102 to rotate together.

According to the present invention, when the rotational structure body 112 rotates along with the drill bit 102, the rotational structure body 114 may support the material to be processed without receiving any influence from the rotation by the bearing 116, thereby allowing for stable depth adjustment.

Upon moving the depth-adjustable stopper 110 for depth adjustment, the rotational structure body 114 and the rotational structure body 112 may be together moved forth and back by the rotation of the drill, with only the rotational structure body 112 grabbed by hand, thus allowing for convenient depth adjustment.

Meanwhile, the depth-adjustable stopper 110 preferably includes a spring 120 to prevent a shake or being pushed back due to a gap of the male thread portion 102a formed on the outer circumferential surface of the drill bit 102.

The spring 120 allows the depth-adjustable stopper 110 to be supported, preventing the depth-adjustable stopper 110 from being shaken or pushed back upon drilling and thus allowing for drilling to be performed in a stabilized manner.

The fastener body 130 is provided to be fastened to the drill bit 102 to back up the tension of the spring 120.

The fastener body 130 is preferably fastened to be drill bit 102 to be spaced apart from the depth-adjustable stopper 110.

Accordingly, the depth-adjustable stopper 110 is supported by the tension of the spring 120 between the fastener body 130 and the depth-adjustable stopper 110.

Spring fixing grooves 122a and 122b, respectively, are formed in the respective opposite surfaces of the rotational structure body 112 and the fastener body 130, so that both ends of the spring 120 are supported in the spring fixing grooves 122a and 122b, thereby allowing the depth-adjustable stopper 110 to securely be supported by the spring force.

The fastener body 130 preferably includes a female thread portion along an inner circumferential surface thereof which is engaged with the male thread portion of the drill bit 102 to allow the drill bit 102 to be secured to the fastener body 130. The female thread portion of the fastener body 130 is preferably formed only in a portion of an end portion of the fastener body 130 where the inner surface is formed.

According to the present invention, depth adjustment is performed by rotating the depth-adjustable stopper 110. At this time, during drilling, the rotational structure body 112 and the rotational structure body 114 are moved in the axial direction along the male thread portion to enable depth adjustment even though the depth-adjustable stopper 110, i.e., the rotational structure body 112, is simply grabbed by hand.

Further, the present invention may prevent the depth-adjustable stopper 110 from shaking and support the depth-adjustable stopper 110 not to be pushed back by the spring 120 provided between the depth-adjustable stopper 110 and the fastener body 130 during drilling, thereby enabling stable drilling.

Meanwhile, whereas the conventional product is bothersome in use because it adopts a headless bolt that needs to be fastened and released by wrench, the present invention enables easier and accurate adjustment to a desired depth without the need for other tools for drilling.

The conventional product, because of adopting a fastening approach using a headless bolt, may be thickened by the thickness of the headless bolt. According to the present invention, however, the depth-adjustable stopper may be made thinner, enabling deeper drilling.

The present invention is applicable to all types of drilling work requiring depth adjustment.

While the present invention has been shown and described with reference to exemplary embodiments thereof, it will be apparent to those of ordinary skill in the art that various changes in form and detail may be made thereto without departing from the spirit and scope of the present invention as defined by the following claims.

According to the present invention, the male thread portion is formed on the outer circumferential surface of the drill bit, and the depth-adjustable stopper is installed to be moved in the axial direction along the male thread portion, and the depth-adjustable stopper is supported by the spring, preventing the depth-adjustable stopper form being shaken or pushed back. The present invention may be applicable to all drill bit depth-adjustable stopper sectors.

What is claimed is:

1. A depth-adjustable stopper for a drill bit, which is provided to be moved in an axial direction of the drill bit along a male thread portion formed on an outer circumferential surface of the drill bit to be able to adjust a depth of a hole drilled, the depth-adjustable stopper comprising:
   a spring configured to prevent the depth-adjustable stopper from being shaken or pushed back due to a gap of the male thread portion;
   a fastener body fastened to the drill bit while spaced apart from the depth-adjustable stopper to support a tension of the spring;
   a rotational structure body including a female thread portion formed on an inner circumferential surface thereof to be engaged with the male thread portion of the drill bit and moving in the axial direction along the male thread portion of the drill bit;
   an adjusting structure body including a through hole to allow the rotational structure body to fit thereinto and configured to freely rotate from the rotational structure body to face a material to be processed; and
   a bearing provided between an inner circumferential surface of the adjusting structure body and an outer circumferential surface of the rotational structure body, wherein when the rotational structure body rotates along with the drill bit, the adjusting structure body supports the material without receiving any influence from the rotation by the bearing, wherein
   spring fixing grooves are formed in respective opposite surfaces of the rotational structure body and the fastener body to support both ends of the spring.

2. The depth-adjustable stopper of claim 1, wherein an anti-slip knurling portion is formed on an outer surface of the rotational structure body.

3. The depth-adjustable stopper of claim 1, wherein the fastener body includes a female thread portion on an inner circumferential surface to be engaged with the male thread portion of the drill bit to be fastened, and wherein the female thread portion is formed in a portion of an end of the fastener body where the inner surface is formed.

* * * * *